May 4, 1965        J. V. BARNES        3,181,655

AUTOMATIC BRAKE ADJUSTOR

Original Filed Sept. 22, 1961

JOHN V. BARNES
INVENTOR.

BY *John R. Faulkner*
*Clifford L. Sadler*

ATTORNEYS

# United States Patent Office 3,181,655
Patented May 4, 1965

3,181,655
AUTOMATIC BRAKE ADJUSTOR
John V. Barnes, Detroit, Mich., assignor to Ford Motor Company, Dearborn, Mich., a corporation of Delaware
Continuation of application Ser. No. 140,008, Sept. 22, 1961. This application Nov. 18, 1963, Ser. No. 325,210
5 Claims. (Cl. 188—79.5)

This application is a continuation of my earlier filed copending application Serial Number 140,008 filed September 22, 1961 now abandoned.

This invention relates to an automotive brake construction and more particularly to a device that automatically adjusts the brake clearance to compensate for wear of the frictional lining material.

With automotive brakes it is desirable, if not essential, that the braking action be consistent during the life of the frictional lining material. Uniform brake action requires a uniform degree of brake pedal travel during successive applications of the brakes. In the conventional duo-servo brake, this is accomplished by periodic adjustment of a threaded transfer link interposed between the adjacent ends of the brake shoes to compensate for wear of the frictional lining.

To eliminate the periodic adjustment required by conventional brakes and to maintain uniform brake pedal travel, various devices have been proposed to automatically adjust the brakes. Virtually, all of these devices have proven unsatisfactory for high volume production because of high cost, failure to consistently make adequate adjustment, and, at times, over adjustment. The unsatisfactory performance can usually be traced to one or both of the following reasons:

(1) The adjustment is made if lining wear causes excessive travel of the brake shoes. Under high temperature and high load conditions, over adjustment will be made because of drum deflection. This results in increased lining wear.

(2) The adjustment mechanism is operated by the relative movement between three or more of the brake components. The commercial tolerances of the parts, because of cost consideration, is too broad to insure consistent action and over or under adjustment results.

An automatic brake adjusting mechanism should be constructed to permit its utilization with as many standard brake parts as possible. It should also have few parts and produce uniform adjustment over widely varying load conditions.

The present invention provides these objects by substituting a one-way extensible link for the conventional transfer link interposed between the adjacent ends of the brake shoes. If the clearance between the shoes and brake drum is greater than an amount predetermined by a lost motion connection between the shoes and link, the link will be extended to accomplish adjustment when the brakes are applied. The adjustment takes place prior to engagement of the shoes with the brake drum because of a unique mode of brake operation, therefore, the device is insensitive to high loads and drum deflections.

Further objects and advantages of this invention will become more apparent as this description proceeds, particularly when considered in conjunction with the accompanying drawings, wherein.

Figure 2:
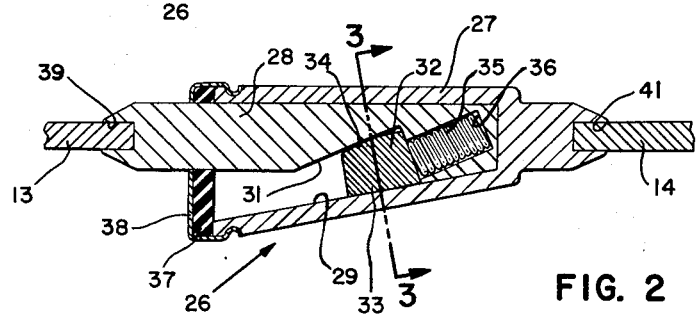
FIGURE 2 is a cross sectional view taken along the line 2—2 of FIGURE 1.
Figures 3, 4:
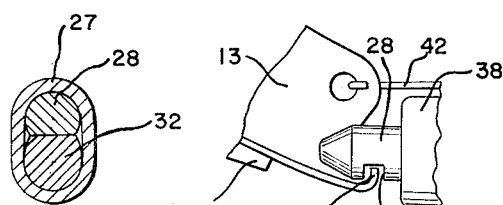

FIGURE 3 has a cross sectional view taken along line 3—3 of FIGURE 2.

FIGURE 4 is an enlarged view showing the left-hand portion of the automatic adjusting device of this invention.

Figure 1:
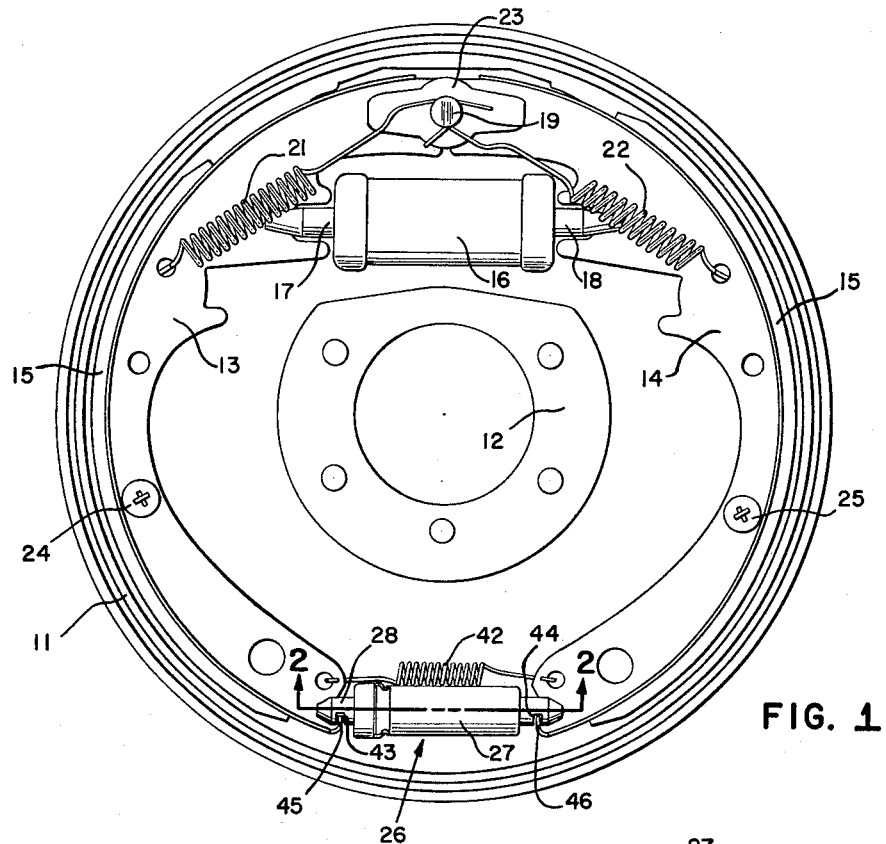
FIGURE 1 illustrates a duo-servo brake incorporating the present invention.

Referring now in detail to the drawings and in particular to FIGURE 1, a rotatably supported brake drum is identified by the numeral 11. Supported within the brake drum 11 on a stationary backing plate 12 are primary and secondary brake shoes 13 and 14 having friction linings 15. A hydraulically actuated wheel cylinder 16 is disposed contiguous to the adjacent upper ends of the brake shoes 13 and 14 and acts through plungers 17 and 18 to urge the brake shoes outwardly bringing the linings 15 into engagement with the brake drum 11.

Both of the brake shoes 13, 14 are spring urged normally against a stationary anchor pin 19 secured to the backing plate 12 by retraction springs 21 and 22. The springs 21 and 22 further serve to collapse the wheel cylinder 16 when hydraulic pressure is released. An anchor pin plate 23 and hold-down springs 24 and 25 hold the primary and secondary brake shoes 13 and 14 against the backing plate 12, but permit radial movement of the shoes toward and away from the brake drum 11. The structure thus far described is conventional in duo-servo brake construction and forms no part of the instant invention.

The automatic adjusting device of this invention, indicated generally at 26, is disposed between the adjacent lower ends of the primary and secondary brake shoes 13, 14 and its construction may be best understood by reference to FIGURE 2. The automatic adjusting device 26 includes a first housing 27 having an internal cavity which slidably receives a shaft 28. The housing 27 and the shaft 28 have facing inclined surfaces 29 and 31, respectively. It will be noted that these surfaces are not parallel, but are angularly disposed relative to each other. A locking dog 32 is interposed between the surfaces 29 and 31 and has inclined surfaces 33 and 34 which are substantially parallel to the surfaces 29 and 31. A wider latitude in the tolerances of the adjacent surfaces may be obtained if one of the inclined surfaces 33 and 34 is made slightly arcuate.

A coil spring 35 received in a cavity 36 formed in the shaft 28 normally urges the dog 32 into contact with the inclined surfaces 29 and 31 of the shaft 28 and the housing 27. The angular relationship between surfaces 29, 31, 33, 34 and the coefficient of friction of the various parts are so chosen that the shaft 28 and the housing 27 may move in opposite directions only when force is applied. Axial forces tending to compress the shaft 28 into the housing 27 are, however, resisted by the self-locking or wedging of the locking dog between surfaces 29 and 31. The automatic adjusting device 26 thereby acts as a one-way extensible link.

In designing the various components of automatic adjusting device 26, dimensional stability of the length of the device must be maintained under no load condition. That is, the action of the spring 35 should not be such as to cause the link to spread. The construction should, however, permit the automatic adjusting device 26 to expand upon the exertion of slight axial loads. Since the servo effect of the primary shoe 13 is transferred to the secondary shoe 14 through the adjusting device 26 to the secondary shoe 14, the device 26 should resist compression under high degrees of loading. Since consistency of the coefficient of friction cannot be insured, the device 26 should be constructed to tolerate wide variances in the coefficient of friction. It has been found that the above desired results may be obtained if the angle of the surfaces 31 and 34 is not a self-locking angle for the highest anticipated coefficient of friction and the angle of surfaces 29 and 33 is a self-locking angle for the lowest anticipated coefficient of friction. The included angle between 31 and 29 must also be related to the lowest coefficient of friction.

An annular seal 37, held in place by a dust cover 38, prevents entry of foreign material into the interior or the automatic adjusting device 26.

The outer end of shaft 28 is formed with a slot 39 into which the lower end of the primary brake shoe 13 is received. In a like manner, the adjacent end of the secondary shoe 14 is received in a slot 41 formed in the housing 27. A coil spring 42 is interposed between the brake shoes 13 and 14 to retain them in the slots 39 and 41 (FIGURE 1). The spring 42 serves to prevent rattle when the shoes 13 and 14 are retracted, but is light enough to offer little or no resistance to energization of the brake.

Enlarged slots 43 and 44 are formed in the shaft 28 and the housing 27, respectively. Tangs 45 and 46 formed on the primary and secondary shoes 13 and 14 extend into these slots to form a lost motion connection between each shoe and the corresponding portion of the automatic adjusting device 26. The lost motion connection is shown in greater detail in FIGURE 4.

*Operation*

To insure proper functioning of the automatic adjusting device 26, it is essential that, during initial actuation of the brake shoes 13 and 14, the shoes spread first at their lower ends. This mode of operation may be obtained through the use of a higher preload on the return springs 21 and 22 than would be normally utilized. The spring 42 will be of a lower rate and more lightly loaded than is found in the conventional brake. Alternatively, a specially formed retractor spring may be employed. The construction must be such that the movement created by the return springs about the axis of the plungers is greater than that caused by the spring 42 and the force required to spread the automatic adjusting device 26.

When fluid pressure is applied to actuate the wheel cylinder 16, the primary and secondary brake shoes 13 and 14 move outwardly at their lower ends, pivoting about the anchor pin 19 from the position shown in FIGURE 1. This movement continues until the frictional linings 15 come into contact with the drum 11. During this initial movement, the spring 42 yields and the clearance between the tangs 45, 46 and the slots 43 and 44 permit free movement without effect upon the automatic adjusting device 26 unless linings 15 are worn more than a predetermined amount. Once the shoes 13 and 14 move sufficiently to bring the linings 15 into contact with the drum 11, friction forces cause the primary shoe 13 to rotate slightly away from the anchor pin 19 until it is stopped by the compressive resistance of the automatic adjusting device 26. The servo force exerted by the primary shoe 13 is then transmitted through the automatic adjusting device 26 to the secondary shoe 14 which is positioned against the anchor pin 19.

The width of the slots 43 and 44 determines the amount the linings 15 may wear before adjustment is made. If the wear of linings 15 is greater than a predetermined amount, excessive travel of the shoes 14 and 15 will result. This will cause the tangs 45 and 46 to contact the outer ends of the slots 43 and 44. The force exerted in applying the brake shoes 13 and 14 by the wheel cylinder 16 will then create axial forces on the shaft 28 and the housing 27 and cause them to move in opposite directions. When hydraulic pressure is no longer present, the wheel cylinder 16 and the retraction springs 21 and 22 will withdraw the shoes 13 and 14. The self-locking action of the dog 32 in the automatic adjusting device 26 will, however, resist compression and the only movement of shoes 13 and 14 permitted will be that allowed by the lost motion connections between tangs 45 and 46 and the slots 43 and 44. The automatic adjusting device 26 thereby makes a brake adjustment by returning the retracted position of the system to design clearances. It will be noted that the adjustment takes place immediately prior to engagement of the linings 15 with the brake drum 11. The adjustment will be unaffected by drum deflection.

When linings 15 have worn to the point at which they require replacement, the automatic adjusting device 26 is compressed by removing the dust cover 38 and the seal 37 and inserting a tool to urge locking dog 32 against the spring 35 to free the other parts for movement.

It is to be understood that the invention is not to be limited to the exact construction shown and described, but that various changes and modifications may be made without departing from the spirit and scope of the invention as defined by the appended claims.

I claim:

1. A brake assembly comprising a backing plate, a pair of arcuate brake shoes movably connected to said backing plate, said shoes having adjacent upper ends and adjacent lower ends, an anchor pin secured to said backing plate and interposed between said upper ends, first retractor spring means urging said upper ends into engagement with said anchor pin, a hydraulic actuator secured to said backing plate and having extendable strut members engaging said shoes, an automatic adjusting device interconnecting the said lower ends of said shoes, said lower ends each having a flat web portion lying in a plane parallel to the general plane of said backing plate, a rim portion secured to each of said web portions, a tang extending radially inwardly from the end of each of said rim portions, said device including a first element having a first slot engaging one of said webs and a second slot generally perpendicular to said first slot engaging one of said tangs, said device including a second element with a first slot engaging the other of said webs and a second slot generally perpendicular to said first slot engaging the other of said tangs, said second slots having a greater width than the width of said tangs, second retractor spring means interposed between said lower ends, said second spring means applying a spring force urging said webs into engagement with the depths of said first slots, said second spring means also maintaining said second slots in engagement with said tangs, said first element of said device having a first surface, said second element having a second surface inclined with respect to said first surface, a wedging element and spring means urging said wedging element into engagement with said surfaces whereby said first and second elements of said device may be separated but are prevented from moving together, said first spring means exerting a greater retracting force than said second spring means so that said lower ends will move apart when said actuator is activated while said upper ends will be held against said anchor pin.

2. A brake assembly comprising a backing plate, a pair of arcuate brake shoes movably connected to said backing plate, said shoes having adjacent upper ends and adjacent lower ends, an anchor pin secured to said backing plate and interposed between said upper ends, first spring means urging said upper ends into engagement with said anchor pin, a hydraulic actuator secured to said backing plate and having extendable strut members engaging said shoes, an automatic adjusting device interconnecting said lower ends of said shoes, said lower ends each having a flat web portion lying in a plane parallel to the general plane of said backing plate, a rim portion secured to each of said web portions, a tang extending radially inwardly from the end of each of said rim portions, said device including a first element having a first slot engaging one of said webs and a second slot generally perpendicular to said first slot engaging one of said tangs, said device also including a second element with a first slot engaging the other of said webs and a second slot generally perpendicular to said first slot engaging the other of said tangs, said second slots having a greater width than the width of said tangs, second spring means interposed between said lower ends, said second spring means applying a spring force urging said webs into engagement with the depths of said first slots, said second spring means also maintaining said second slots in engagement with said tangs, said first element of said device having a first surface, said second element having a second surface inclined with respect to said first surface, a wedging element and spring means urging said wedging element into engagement with said surfaces whereby said first and second elements of said device may be separated but are prevented from moving together.

3. A brake assembly comprising a backing plate, a pair of arcuate brake shoes movably connected to said backing plate, said shoes having a pair of adjacent ends, an adjusting device interconnecting said ends of said shoes, said ends each having a flat web portion lying in a plane parallel to the general plane of said backing plate, a rim portion secured to each of said web portions, a tang extending radially inwardly from the end of each of said rim portions, said device including a first element having a first slot engaging one of said webs and a second slot generally perependicular to said first slot engaging one of said tangs, said device also including a second element with a first slot engaging the other of said webs and a second slot generally perpendicular to said first slot engaging the other of said tangs, spring means interposed between said ends, said spring means applying a spring force urging said webs into engagement with the depths of said first slots, said spring means also maintaining said second slots in engagement with said tangs.

4. A brake assembly comprising a backing plate, a pair of arcuate brake shoes movably connected to said backing plate, said shoes having a pair of adjacent ends, an automatic extensible adjusting device interconnecting said ends of said shoes, said ends each having a flat web portion lying in a plane parallel to the general plane of said backing plate, a rim portion secured to each of said web portions, a tang extending radially inwardly from the end of each of said rim portions, said device including a first element having a first slot engaging one of said webs and a second slot generally perpendicular to said first slot engaging one of said tangs, said device also including a second element with a first slot engaging the other of said webs and a second slot generally perpendicular to said first slot engaging the other of said tangs, at least one of said second slots having a greater width than the width of its tang so that it forms a lost motion connection, spring means interposed between said lower ends, said spring means applying a spring force urging said webs into engagement with the depths of said first slots, said spring means also maintaining said second slots in engagement with said tangs.

5. A brake assembly comprising a backing plate, a pair of arcuate brake shoes movably connected to said backing plate, said shoes having adjacent upper ends and adjacent lower ends, an anchor pin secured to said backing plate and interposed between said upper ends, first retractor spring means urging said upper ends into engagement with said anchor pin, a hydraulic actuator secured to said backing plate and having extendable strut members engaging said shoes, an automatic adjusting device interconnecting the said lower ends of said shoes, said lower ends each having a flat web portion lying in a plane parallel to the general plane of said backing plate, a rim portion secured to each of said web portions, a tang extending radially inwardly from the end of each of said rim portions, said device including a first element having a first slot engaging one of said webs and a second slot generally perpendicular to said first slot engaging one of said tangs, said device including a second element with a first slot engaging the other of said webs and a second slot generally perpendicular to said first slot engaging the other of said tangs, said second slots having a greater width than the width of said tangs, second retractor spring means interposed between said lower ends, said second spring means applying a spring force urging said webs into engagement with the depths of said first slots, said first element of said device having a first surface, said second element having a second surface inclined with respect to said first surface, a wedging element and spring means urging said wedging element into engagement with said surfaces whereby said first and second elements of said device may be separated but are prevented from moving together, said first spring means exerting a greater retracting force than said second spring means so that said lower ends will move apart when said actuator is activated while said upper ends will be held against said anchor pin.

References Cited by the Examiner

UNITED STATES PATENTS 2,788,095 4/57 Brooks _____ 188—196
2,875,860 3/59 Eckardt et al. _____ 188—79.5

FOREIGN PATENTS 44,436 10/34 France.

EUGENE G. BOTZ, *Primary Examiner.*

ARTHUR L. LA POINT, *Examiner.*